US007135112B2

(12) United States Patent
Schroeder et al.

(10) Patent No.: US 7,135,112 B2
(45) Date of Patent: Nov. 14, 2006

(54) FLOCCULATION APPARATUS FOR TREATING COLLOIDAL SUSPENSIONS

(75) Inventors: Christian Schroeder, Clausthal-Zellerfeld (DE); Michael Sievers, Clausthal-Zellerfeld (DE)

(73) Assignee: Clausthaler Umwelttechnikinstitut GmbH (CUTEC-Institute), Clausthal-Zellerfeld (DE)

(*) Notice: Subject to any disclaimer, the term of this patent is extended or adjusted under 35 U.S.C. 154(b) by 121 days.

(21) Appl. No.: 10/491,289

(22) PCT Filed: Sep. 26, 2002

(86) PCT No.: PCT/DE02/03654

§ 371 (c)(1), (2), (4) Date: Mar. 31, 2004

(87) PCT Pub. No.: WO03/031040

PCT Pub. Date: Apr. 17, 2003

(65) Prior Publication Data

US 2004/0262230 A1 Dec. 30, 2004

(30) Foreign Application Priority Data

Oct. 2, 2001 (DE) ................................ 101 48 760

(51) Int. Cl.
*C02F 1/52* (2006.01)

(52) U.S. Cl. ....................... 210/199; 210/205; 210/219; 366/168.1; 366/286; 366/290; 366/305

(58) Field of Classification Search ................ 210/738; 366/172.1

See application file for complete search history.

(56) References Cited

U.S. PATENT DOCUMENTS

| | | | | |
|---|---|---|---|---|
| 2,793,847 | A | | 5/1957 | Steele |
| 2,969,960 | A | * | 1/1961 | Gurley, Jr. .................. 366/303 |
| 3,420,506 | A | * | 1/1969 | Gurley, Jr. .................. 366/317 |
| 3,831,907 | A | * | 8/1974 | Claes ....................... 366/172.1 |
| 3,834,541 | A | | 9/1974 | Rundell et al. |
| 4,008,153 | A | * | 2/1977 | Mackrle et al. ............. 210/208 |
| 4,295,973 | A | * | 10/1981 | Jain ........................... 210/738 |
| 4,414,184 | A | * | 11/1983 | Pinkston ..................... 422/133 |
| 5,088,831 | A | * | 2/1992 | Reinhall .................. 366/171.1 |
| 5,823,673 | A | * | 10/1998 | Muntener ................... 366/303 |
| 5,902,042 | A | * | 5/1999 | Imaizumi et al. ........ 366/176.2 |
| 7,014,775 | B1 | * | 3/2006 | Sharpe et al. ............... 210/709 |

FOREIGN PATENT DOCUMENTS

| | | |
|---|---|---|
| DE | 289 754 A5 | 5/1991 |
| GB | 1 520 490 | 8/1978 |

OTHER PUBLICATIONS

A. Hemme, et al., "Pelleting Flocculation—The Alternative to Traditional Sludge Conditioning", Aufbereitungs-Technik 36 (1995), No. 5, pp. 226-235.

M. Reiter, et al., "The flow-through cylinder stirrer in the range of turbulent flow—an apparatus with interesting properties", V.T. —Verfahrenstechnik 14 (1980) No. 9, pp. 578-582.

* cited by examiner

*Primary Examiner*—Peter A. Hruskoci
(74) *Attorney, Agent, or Firm*—Greenblum & Bernstein, P.L.C.

(57) ABSTRACT

A flocculation apparatus and method for treating colloidal suspensions. The apparatus includes a suspension inlet, a suspension outlet and an inner cone mounted centrally in a conical outer housing. The inner cone and/or the outer housing is rotatable relative to one another and a gap for through-flow of suspensions is present between the inner cone and the outer housing. In the method, continuously measuring a flock size distribution of a suspension stream passed into the flocculation apparatus is provided. Additionally provided is axially displacing the inner cone and/or outer housing as a function of the flock size distribution and the suspension volume flow rate.

12 Claims, 1 Drawing Sheet

FLOCCULATION APPARATUS FOR TREATING COLLOIDAL SUSPENSIONS

BACKGROUND OF THE INVENTION

1. Field of the Invention

The invention relates to a flocculation apparatus and method for treating colloidal suspensions.

2. Background Description

For improving specific properties of a suspension, for example, the dewaterability or thickenability, a flocculant and/or flocculation auxiliary is conventionally added to the suspension and the latter is worked-up mechanically in a flocculation apparatus. The flocculation itself is carried out in a rapid mixer unit so that flocks form. The flocks are formed in a flocculation apparatus, the resulting flocks being pelleted and rounded by shear forces and flock erosion, so that the desired properties of the flocks, for example, increase in the dewaterability or thickening, can be further improved. However, the shear forces must not be too great because then the flocks are then destroyed and the specific flock properties may deteriorate.

With the rapid mixer, the flocculant and/or flocculation auxiliary is dispersed in a suspension by turbulent flow movements. The formation and adsorption reaction times of the flocculation chemicals are very short, and homogeneous mixing-in of the substances must be ensured for optimizing the flock formation results.

The mixing-in of flocculants and/or flocculation auxiliaries is conventionally effected using stirred vessels or by using tubular reactors with plug flow, such as, for example, injection mixers, inline turbo mixers and pumps. Flock formation using a cylinder stirrer, for example, was investigated by M. Reiter, M. Schmidt and U. Wiesmann: The flow-through cylinder stirrer in the range of turbulent flow—an apparatus with interesting properties, V. T.- Verfahrenstechnik 14 (1980) No. 9, pages 578 to 582. In this investigation, the cylinder stirrer consisted of two coaxial cylinders, of which either the inner or the outer cylinder rotates or both cylinders rotate in the same direction or opposite directions at different speeds. It was found that the optimum energy input number is dependent on the residence time in the cylinder stirrer.

Sludge conditioning using a conical pelleting apparatus was described in A. Hemme, R. Polte, P. Ay: Pelleting flocculation—the alternative to conventional sludge conditioning in Aufbereitungs-Technik 36 (1995) No. 5, pages 226 to 235. The sewage sludge stream runs from the cone base downwards to the cone apex, and the flocculation auxiliary is introduced into the conical gap of the pelleting reactor. In the conical pelleting zone, the flock pellets roll in a circular manner on the pelleting surface. Only the mechanically stable pellets having a certain size and strength are discharged. The conditioning process is controlled by a conical stirrer for generating a circulation flow.

For the optimum conditioning of sewage sludges of varying quality and composition, taking into account other process parameters, it is necessary for the substantial parameters, such as, for example, particle size distribution, porosity or the specific surface area of the sewage sludge, to be reproducibly established.

SUMMARY OF THE INVENTION

The invention relates to a flocculation apparatus and method for treating colloidal suspensions. The invention provides a flocculation apparatus which can be adapted in a variable manner to the ambient conditions.

In one aspect of the invention, the flocculation apparatus includes a suspension inlet, a suspension outlet and an inner cone mounted centrally in a conical outer housing, the inner cone and/or the outer housing being rotatable relative to one another and a gap for through-flow of suspensions being present between the inner cone and the outer housing.

In one aspect of the invention, the flocculation apparatus includes an inner cone and/or outer housing mounted so as to be axially displaceable and an actuator cooperates with the inner cone and/or outer housing for controlled axial displacement of the inner cone and/or outer housing. Consequently, the reaction volume in the flocculation apparatus is variable and can be adapted to the ambient conditions. By means of the axial displacement of the inner cone and/or outer housing, the gap width of the flow-through space between the inner cone and outer housing can be easily adjusted. As a result, both the residence time in the case of different volume flow rates can be kept constant and the flow regime can be adapted to changing mass flow rates.

The suspension inlet is preferably present in the region of the cone base of the inner cone and outer housing and the suspension outlet is preferably present in the region of the cone apex of the inner cone and outer housing. In this way, the suspension stream preferably runs from the cone base to the cone apex. It has been found that, in the case of such a direction of flow, the flocculation results are reproducible and optimum.

The surface of the inner cone and/or the inner surface of the outer housing should be profiled, for example by milled longitudinal grooves "GR". The flow is converted faster as a result. The axis of rotation of the inner cone is preferably approximately vertical, the suspension inlet being arranged above the suspension outlet. In this way, a natural suspension flow in a downward direction is forced.

Surprisingly, it has been found that the angle of inclination of the inner cone should be relatively small and should be about 2 to 30 degrees. (In contrast, conventional conical stirrers have an angle of inclination of 35 degrees and cylindrical stirrers an angle of 0 degrees.) It was recognized that optimum reproducible and controllable flocculation results can be achieved with a small angle of inclination.

A mixer for generating a highly turbulent suspension flow is preferably arranged directly upstream of the suspension inlet. Here, the mixer is preferably integrated with the flocculation apparatus to give one device.

The treatment of colloidal suspensions, such as, for example, sewage sludge, using the flocculation apparatus according to the invention is preferably effected by:

- continuous measurement of a flock size distribution of a suspension stream passed into the flocculation apparatus, and
- axial displacement of the inner cone and/or outer housing as a function of a flock size distribution and the suspension volume flow rate.

In addition, the rotational speed of the inner cone and/or outer housing can be controlled as a function of a flock size distribution.

A continuous controlled process in which a flock size distribution is continuously recorded, for example optically, and serves as a control variable for the flocculation apparatus is thus permitted. The flow rate, residence time and reaction volume are thereby adapted to the suspension properties and the flock size distribution by the axial displacement of the inner cone or of the outer housing.

BRIEF DESCRIPTION OF THE DRAWINGS

The invention is explained in more detail below with reference to the attached drawings.

DETAILED DESCRIPTION OF EMBODIMENTS OF THE INVENTION

Figure 1:
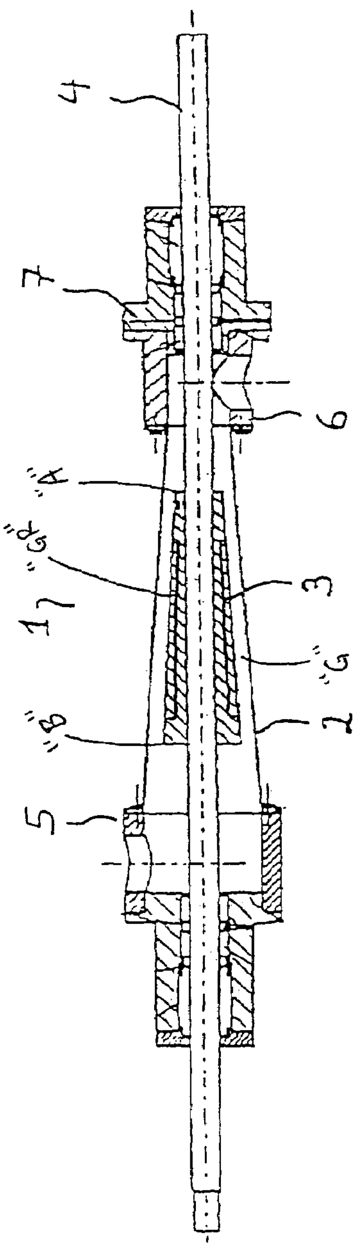
FIG. 1 shows a sectional view of the flocculation apparatus with axially displaceable inner cone.

FIG. 1 shows the flocculation apparatus 1 according to the invention as a sectional view. The flocculation apparatus 1 substantially comprises a conical outer housing 2 and an inner cone 3 which is arranged centrally in the outer housing 2. The inner cone 3 is rotatably mounted on a driven shaft 4.

A suspension stream is passed into the flocculation apparatus 1 through a suspension inlet 5 in the region of the cone base "B" of the inner cone 3. The suspension then flows, together with the flocculant and/or flocculation auxiliary, through the gap "G" between the inner cone 3 and the outer housing 2 in the axial direction from the cone base "B" to the cone apex "A" and flows out through a suspension outlet 6 in the region of the cone apex.

The angle of inclination of the inner cone 3 and, correspondingly, the angle of inclination of the outer housing 2 are relatively small and are in the range from about 2 to 30 degrees. Since the radii of the inner cone 3 for the suspensions flowing through change during the flow-through, the resulting centrifugal forces are not constant, owing to the changing peripheral velocity along the driven shaft 4. In contrast to cylinder stirrers, the flow conditions are not uniform over the length of the circular or conical gap.

If the flocculation apparatus 1 is flowed through from the cone base of the inner cone 3 in the direction of the apex of the truncated cone, the suspension is initially exposed to relatively large shear forces on entering at the cone base since the basic flow is the greatest there owing to the higher peripheral velocity. The shear forces decrease continuously in the direction of decreasing radii of the inner cone 3, so that flock structures already formed are subsequently not destroyed or scarcely destroyed.

The outer housing 2 is considerably longer than the inner cone 3, so that the inner cone 3 is axially displaceable in a wide range. Alternatively, however, the flocculation apparatus 1 can also be designed in such a way that the outer housing 2 can be axially displaced relative to the inner cone 3. It is also conceivable for the outer housing 2 to be rotatable.

As a result of the axial displacement of the inner cone 3 relative to the outer housing 2, the gap between inner cone 3 and outer housing 2 can be adapted in a variable manner. The axial displacement can be realized, for example, with a reciprocating spindle drive as an actuator, which cooperates with the shaft 4. The motor shaft of a drive motor which is not shown is firmly connected to a guide sleeve which cooperates with the shaft 4 by means of a key connection, so that the shaft 4 can be axially displaced relative to the motor shaft. The shaft 4 is preferably mounted in an oblique ball bearing 7, with the bearing housing preferably being square in order to guide the housing in the groove of a guide rail. This ensures that, after coupling by the oblique ball bearing 7, there is no longer any rotation which might affect the reciprocating spindle drive.

Figure 2:
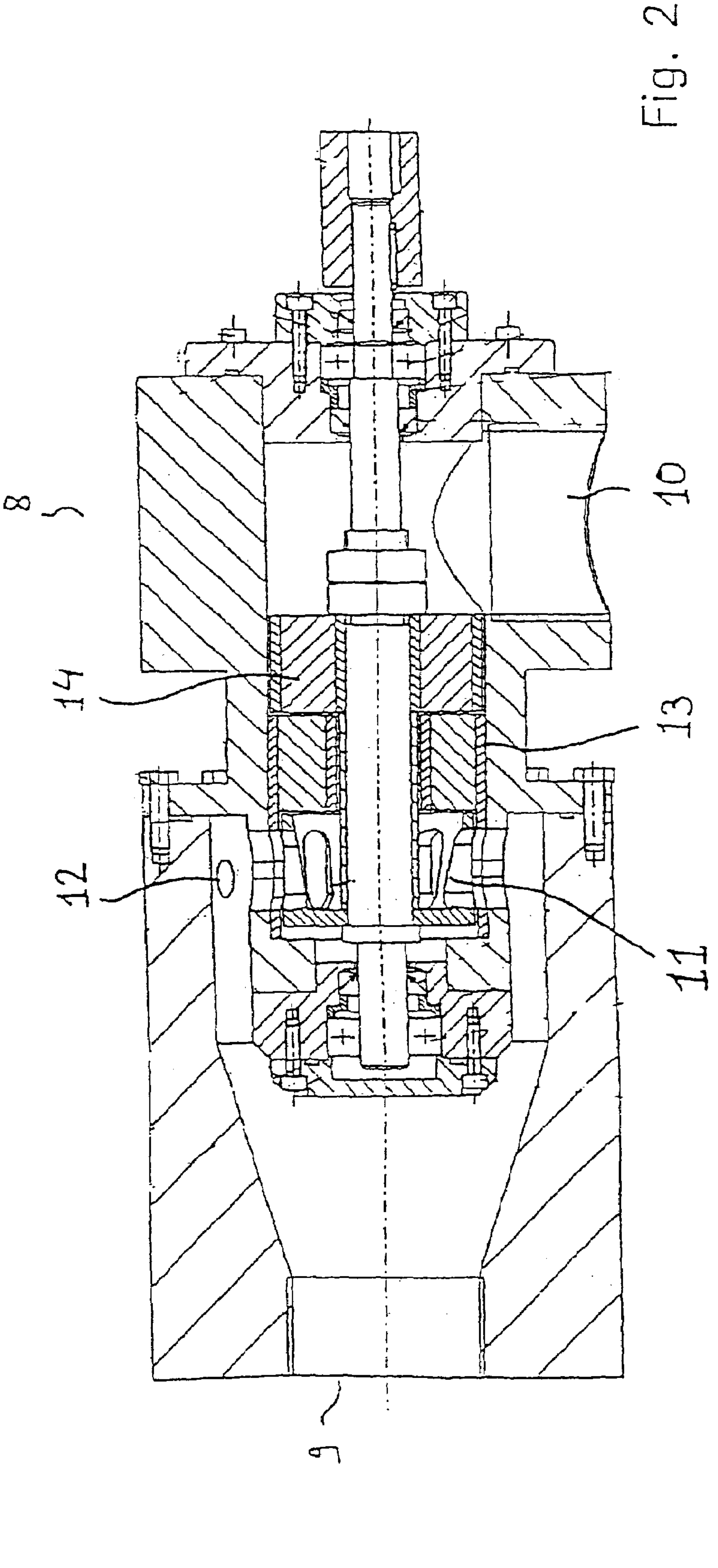
FIG. 2 shows a sectional view of a rapid mixer for generating a highly turbulent suspension flow.

FIG. 2 shows a rapid mixer 8 having a suspension inlet 9 and a suspension outlet 10. The suspension outlet 10 is connected directly upstream of the suspension inlet 5 of the flocculation apparatus 1. The rapid mixer 8 has a main rotor 11 through which the flow is from the outside inwards and which is equipped with positioned, blade-like paddles which entrain the suspension in the conveying direction. The flocculant and/or flocculation auxiliary is fed to the rapid mixer 8 via four connecting pieces 12 distributed over the circumference. After thorough mixing in the main rotor 11, the medium enters a stator 13 which is mounted in between and whose casing is lengthened beyond the region of the main rotor 11 in order to reduce wear.

An auxiliary rotor 14 is provided behind the stator 13 in the direction of flow. This arrangement of the main rotor 11, stator 13 and auxiliary rotor 14 connected in series ensures homogeneous mixing of the medium within a certain residence time. The rotor speed should be continuously adjustable up to about 2800 N/min.

With the aid of the arrangement of rapid mixer 8 and flocculation apparatus 1 connected in series, the conditioning process can be controlled with four different degrees of freedom. In the rapid mixer, the flocculant and/or flocculation auxiliary are homogeneously mixed in, and total flocculation of the suspension is carried out. Here, the amount of flocculant and/or flocculation auxiliary introduced and the magnitude of the mixing energy can be varied by adapting the rotational speed of the rapid mixer 8.

By means of the flocculation apparatus, the flocculation is made discrete. The aggregates of the total flocculations, which differ in size, are eroded, reflocculated, compacted and standardized by being subjected to shear forces. For this purpose, the rotational speed and the reaction volume of the apparatus is changeable in the flocculation apparatus 1. Consequently, the flocks may be exposed in a wide range to an adapted shear force regime.

The adjustment of the rapid mixer 8 and of the flocculation apparatus 1 is therefore effected as a function of the volume flow rate and in particular of the flock size and of the flock size distribution. In fact, the flock size and the flock size distribution have, for example, a decisive effect on the dewaterability and thickenability of suspensions, such as, for example, sewage sludge. For optimum dewatering, it is critical that a certain flock size distribution be present. Small structures, such as unflocculated primary particles, and very small fractals in the flock suspension adversely affect, for example, the dewatering result or the sedimentation behavior. Likewise, structurally unstable flocks have an adverse effect.

The rapid mixer 8 is now regulated in such a way that the flocculant and/or flocculation auxiliary is homogeneously and completely mixed with the suspension. It is necessary for sufficient energy to flow into the suspension/flocculant and/or flocculation auxiliary mixture that every suspension particle has the possibility of binding with flocculant and/or flocculation auxiliary. On the other hand, the quantity of energy used should only be such that the flocks are not destroyed again during or immediately after their formation. For this purpose, the speed should be adjusted accordingly in a known manner which has been widely investigated scientifically.

In the flocculation apparatus 1, the rotational speed and the gap width between inner cone 3 and outer housing 2 are varied. Changing the gap width results in both volume change and hence a change in the axial characteristics, such as residence time, axial velocity, axial Reynold's number and axial Camp's number, and a change in the radius conditions and hence a change in Taylor's number and the rotational Camp's number. Consequently, the flow conditions can be varied within a wide range.

For this purpose, the flock size distribution is determined, preferably optically, in addition to the volume flow rate, and the rapid mixer 8 and the flocculation apparatus 1 are controlled so that an optimum flock size distribution results. This permits conditioning in a closed, self-adapting control system.

While the invention has been described in terms of preferred embodiments, those skilled in the art will recognize that the invention can be practiced with modification within the spirit and scope of the appended.

The invention claimed is:

1. A flocculation apparatus for treating colloidal suspensions, comprising a flocculation forming device comprising a suspension inlet, suspension outlet and an inner cone mounted centrally in a conical outer housing, at least one of the inner cone and the outer housing being rotatable relative to one another, and a gap for through-flow of suspensions being present between the inner cone and the outer housing, wherein at least one of the inner cone and the outer housing is mounted so as to be axially displaceable and an actuator cooperates with the at least one of the inner cone and outer housing for controlled axial displacement of at least one of the inner cone and outer housing, and the flocculation apparatus further comprising a mixer adapted for generating highly turbulent suspension flow, said mixer comprising a mixer suspension inlet and a mixer suspension outlet, a rotor, and connecting pieces distributed over the circumference of the rotor for feeding flocculant and/or flocculant auxiliary to said mixer, wherein the mixer suspension outlet is connected directly upstream of the suspension inlet of the flocculation forming device.

2. The flocculation apparatus as claimed in claim 1, wherein the suspension inlet is in a region of a cone base of the inner cone and outer housing and the suspension outlet is in a region of a cone apex of the inner cone and of the outer housing, and the suspension stream runs from the cone base to the cone apex.

3. The flocculation apparatus as claimed in claim 1, wherein the surface of at least one of the inner cone and the inner surface of the outer housing is profiled.

4. The flocculation apparatus as claimed in claim 3, wherein the profile is formed from longitudinal grooves.

5. The flocculation apparatus as claimed in claim 1, wherein the axis of rotation of the inner cone is approximately vertical and the suspension inlet is arranged above the suspension outlet.

6. The flocculation apparatus as claimed in claim 1, wherein an angle of inclination of the inner cone is about 2 to 30 degrees.

7. A flocculation apparatus, comprising: a conical outer housing; an inner cone arranged centrally in the outer housing, the inner cone being rotatably mounted on a driven shaft; a suspension inlet in the region of a cone base of the inner cone; a gap formed between the inner cone and the outer housing in an axial direction from the cone base to a cone apex; and a suspension outlet proximate to the cone apex, wherein a radii of the inner cone for the suspensions flowing through changes during the flow-through resulting in non constant centrifugal forces owing to changing peripheral velocity along the driven shaft, and the flocculation apparatus further comprising a mixer adapted for generating highly turbulent suspension flow, said mixer comprising a mixer suspension inlet and a mixer suspension outlet, a rotor, and connecting pieces distributed over the circumference of the rotor for feeding flocculant and/or flocculant auxiliary to said mixer, wherein the mixer suspension outlet is connected directly upstream of the suspension inlet of the flocculation forming device, and wherein an angle of inclination of the inner cone and the outer housing are in the range from about 2 to 30 degrees.

8. The apparatus of claim 7, wherein the apex of the cone is truncated such that suspension is initially exposed to larger shear forces on entering at the cone base than that of the cone apex due to greater flow owing to higher peripheral velocity.

9. The apparatus of claim 8, wherein the shear forces decrease continuously in the direction of decreasing radii of the inner cone.

10. The apparatus of claim 7, wherein the outer housing is longer than the inner cone so that the inner cone is axially displaceable.

11. The apparatus of claim 7, wherein the outer housing is axially displaced relative to the inner cone such that the outer housing is rotatable.

12. The apparatus of claim 7, wherein the gap is variable due to the axial displacement of the inner cone relative to the outer housing.

* * * * *